United States Patent
Groves et al.

(10) Patent No.: US 6,464,048 B1
(45) Date of Patent: Oct. 15, 2002

(54) SOLENOID ACTUATED CONTINUOUSLY VARIABLE SHOCK ABSORBER

(75) Inventors: Gary W. Groves, Monroe, MI (US); Karl Kazmirski, Toledo, CO (US); David L. Steed, Perrysburg, OH (US); Michael L. Zebolsky, Tecumseh, MI (US)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/624,682

(22) Filed: Jul. 24, 2000

(51) Int. Cl.$^7$ .................................................. F16F 9/34
(52) U.S. Cl. ..................................... 188/266.6; 188/315
(58) Field of Search ........................... 188/266.1, 266.2, 188/266.3, 266.4, 266.5, 266.6, 297, 313, 314, 315, 316, 317, 318, 319.1

(56) References Cited

U.S. PATENT DOCUMENTS

| | | | |
|---|---|---|---|
| 3,638,885 A | * | 2/1972 | Reed ........................... 188/313 |
| 3,757,910 A | | 9/1973 | Palmer |
| 4,084,668 A | * | 4/1978 | Rybicki ....................... 188/314 |
| 4,113,072 A | | 9/1978 | Palmer |
| 4,826,207 A | | 5/1989 | Yoshioka et al. |
| 4,854,429 A | | 8/1989 | Casey |
| 4,890,858 A | | 1/1990 | Blankenship |
| 4,958,705 A | * | 9/1990 | Horvath ....................... 188/314 |
| 4,986,393 A | * | 1/1991 | Preukschat et al. ......... 188/313 |
| 5,285,878 A | | 2/1994 | Scheffel et al. |
| 5,472,070 A | * | 12/1995 | Feigel ........................ 188/266.6 |
| 5,586,627 A | | 12/1996 | Nezu et al. ............... 188/266.6 |
| 5,588,510 A | | 12/1996 | Wilke ........................ 188/266.6 |
| 5,655,633 A | | 8/1997 | Nakadate et al. ........ 188/266.6 |
| 5,901,820 A | * | 5/1999 | Kashiwagi et al. ....... 188/266.6 |
| 5,996,748 A | * | 12/1999 | Nezu et al. ............... 188/266.6 |

* cited by examiner

*Primary Examiner*—Jack Lavinder
*Assistant Examiner*—Thomas J. Williams
(74) *Attorney, Agent, or Firm*—Harness, Dickey & Pierce, PLC

(57) ABSTRACT

A shock absorber includes a pressure tube with a piston slidably disposed therein. A separate valve includes a fluid circuit for fluid low in rebound and a fluid circuit for fluid flow in compression. Each fluid circuit includes a variable orifice which allows selection between a firm rebound with a soft compression, a soft rebound with a soft compression and a soft rebound with a firm compression. Each variable orifice is in communication with a blowoff valve in such a manner that they provide a variable blowoff feature to the blowoff valves.

17 Claims, 6 Drawing Sheets

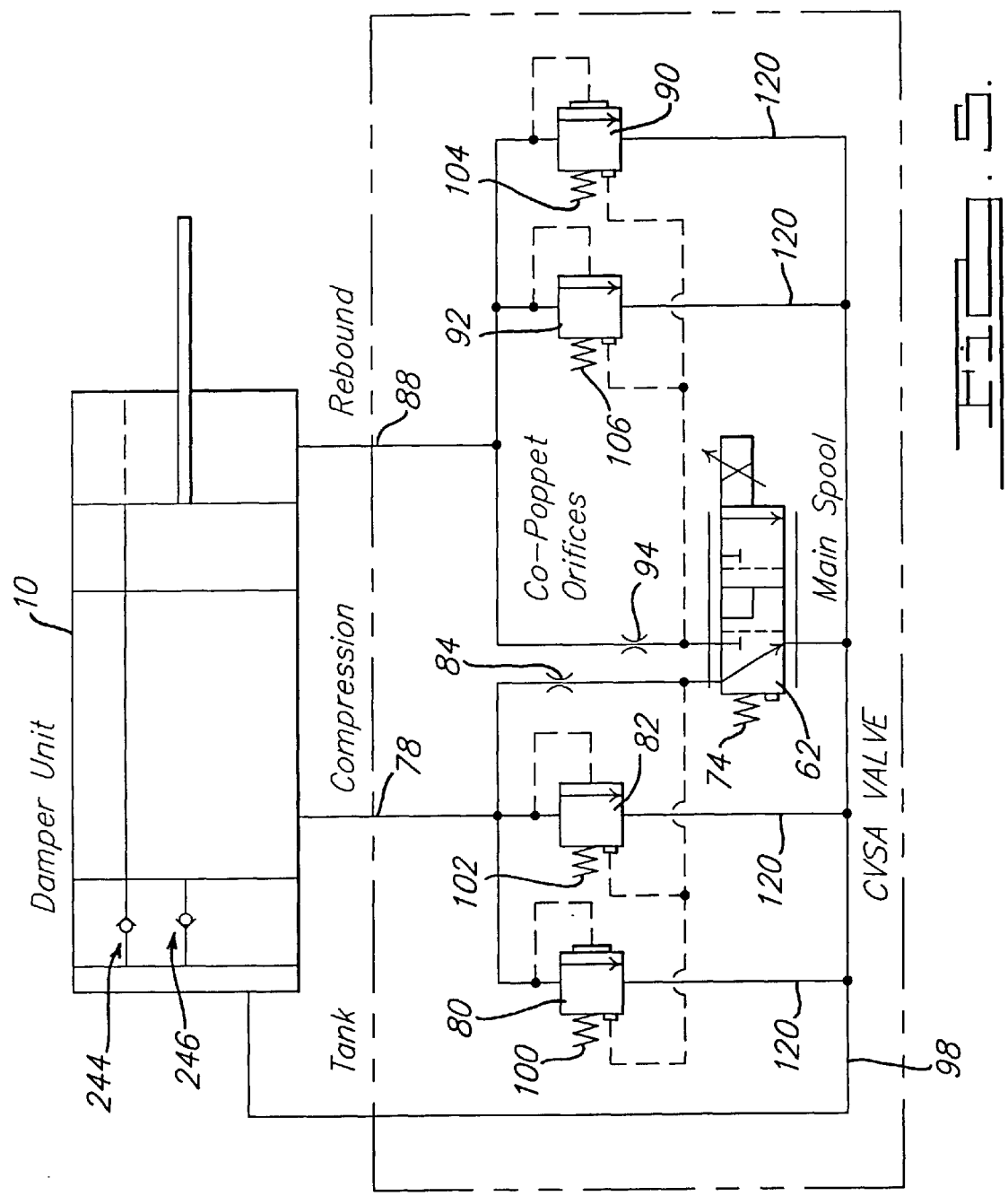

SOLENOID ACTUATED CONTINUOUSLY VARIABLE SHOCK ABSORBER

FIELD OF THE INVENTION

The present invention relates to a hydraulic damper or shock absorber adapted for use in a suspension system such as the suspension systems used for automotive vehicles. More particularly, the present invention relates to a hydraulic damper or shock absorber having a continuously variable damping characteristic which is adjustable by a solenoid actuated continuously variable servo valve to vary the damping characteristics between a relatively low level of damping for a soft ride for comfort and a relatively high level of damping for a firm ride for handling.

BACKGROUND OF THE INVENTION

A conventional prior art hydraulic damper or shock absorber comprises a cylinder which is adapted at one end for attachment to the unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the sprung mass of the vehicle.

Various types of adjustment mechanisms have been developed to generate variable damping forces in relation to the speed and/or the amplitude of the displacement of the sprung mass in relation to the unsprung mass. These adjustment mechanisms have mainly been developed to provide a relatively small or low damping characteristic during the normal steady state running of the vehicle and a relatively large or high damping characteristic during vehicle maneuvers requiring extended suspension movements. The normal steady state running of the vehicle is accompanied by small or fine vibrations of the unsprung mass of the vehicle and thus the need for a soft ride or low damping characteristic of the suspension system to isolate the sprung mass from these small vibrations. During a turning or braking maneuver, as an example, the sprung mass of the vehicle will attempt to undergo a relatively slow and/or large movement or vibration which then requires a firm ride or high damping characteristic of the suspension system to support the sprung mass and provide stable handling characteristics to the vehicle. These adjustable mechanisms for the damping rates of a shock absorber offer the advantage of a smooth steady state ride by isolating the high frequency/small amplitude excitations from the unsprung mass while still providing the necessary damping or firm ride for the suspension system during vehicle maneuvers causing low frequency/large excitations of the sprung mass.

The continued development of shock absorbers includes the development of adjustment systems which provide the vehicle designer with a continuously variable system which can be specifically tailored to a vehicle to provide a specified amount of damping in relation to various monitored conditions of the vehicle and its suspension system.

SUMMARY OF THE INVENTION

The present invention provides the art with a continuously variable adjustable hydraulic damper or shock absorber that includes the capability of adjusting the damping rate of the shock absorber between a firm rebound damping force with a soft compression damping force, a soft rebound force with a soft compression damping force and a soft rebound damping force with a firm compression damping force. A solenoid actuated continuously variable servo valve adjusts the damping force characteristics of the shock absorber and has the capability of positioning the damping force characteristics of the shock absorber anywhere between these configurations and has the capability to provide the continuously variable damping for the shock absorber.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 8 is an enlarged cross-section of the piston and the base valve assembly shown in FIG. 1 during a compression stroke of the shock absorber.

DETAILED DESCRIPTION OF THE PREFERRED EMBODIMENT

Figure 1:
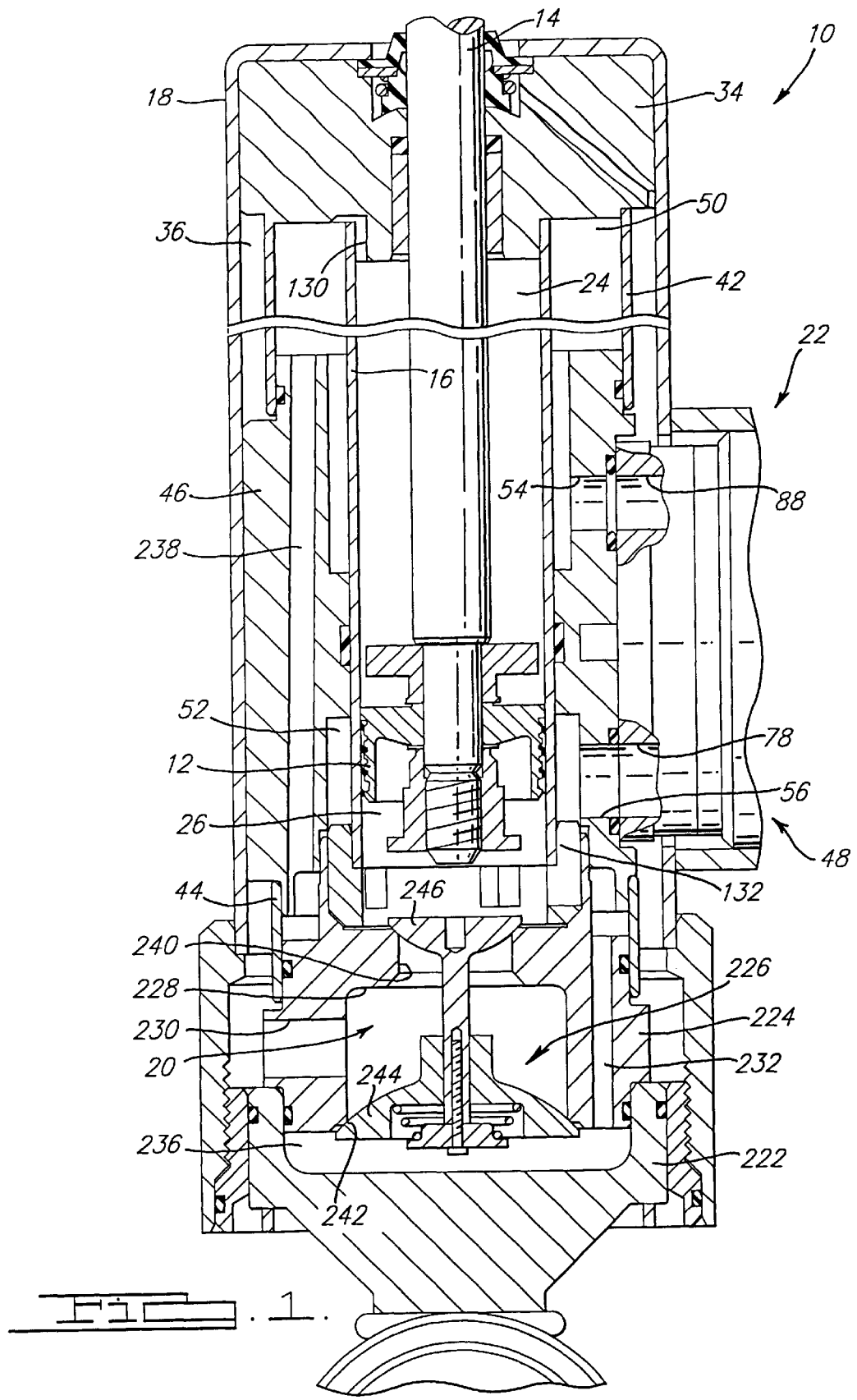
FIG. 1 is a cross-sectional side view of a shock absorber incorporating the continuously variable damping capabilities using piston displaced damping fluid in accordance with the present invention.

Referring now to the drawings in which like reference numerals designate like or corresponding parts throughout the several views, there is shown in FIG. 1 a shock absorber incorporating the continuously variable damping adjustment system in accordance with the present invention which is designated generally by the reference numeral 10. Shock absorber 10 is a dual tube shock absorber which comprises a piston 12, a piston rod 14, a pressure tube 16, a reserve tube 18, a base valve assembly 20 and a continuously variable servo valve assembly 22. Piston 12 is slidingly received within pressure tube 16 and divides pressure tube 16 into an upper working chamber 24 and a lower working chamber 26.

Piston rod 14 is attached to piston 12 and extends out of pressure tube 16 and reserve tube 18 through a rod guide 34. The outer end of piston rod 14 is adapted to be attached to the sprung mass of the vehicle by means known well in the art. Reserve tube 18 surrounds pressure tube 16 and with pressure tube 16 defines a reserve chamber 36. Reserve tube 18 is adapted for attachment to the unsprung mass of the vehicle by methods known well in the art. Base valve assembly 20 is disposed between lower working chamber 26 and reserve chamber 36. Base valve assembly 20 controls the flow of fluid into and out of reserve chamber 36 as described below.

Continuously variable servo valve assembly 22 comprises an upper intermediate tube 42, a lower intermediate tube 44, a valve interface 46 and a solenoid valve assembly 48. Upper intermediate tube 42 is disposed within the upper portion of reserve chamber 36 and sealingly engages rod guide 34. Lower intermediate tube 44 is disposed within the lower portion of reserve chamber 36 and sealingly engages base valve assembly 20. Valve interface 46 is disposed within reserve chamber 36 and sealingly engages upper intermediate tube 42, lower intermediate tube 44 and pressure tube 16. Pressure tube 16, rod guide 34, upper intermediate tube 42 and valve interface 46 define an upper intermediate chamber 50 disposed between reserve chamber 36 and working chambers 24 and 26. Pressure tube 16, base valve assembly 20, lower intermediate tube 44 and valve interface 46 define a lower intermediate chamber 52 disposed between reserve chamber 36 and working chambers 24 and 26. Valve interface 46 defines a rebound outlet 54 in communication with upper intermediate chamber 50 and a compression outlet 56 in communication with lower intermediate chamber 52.

Figure 2:
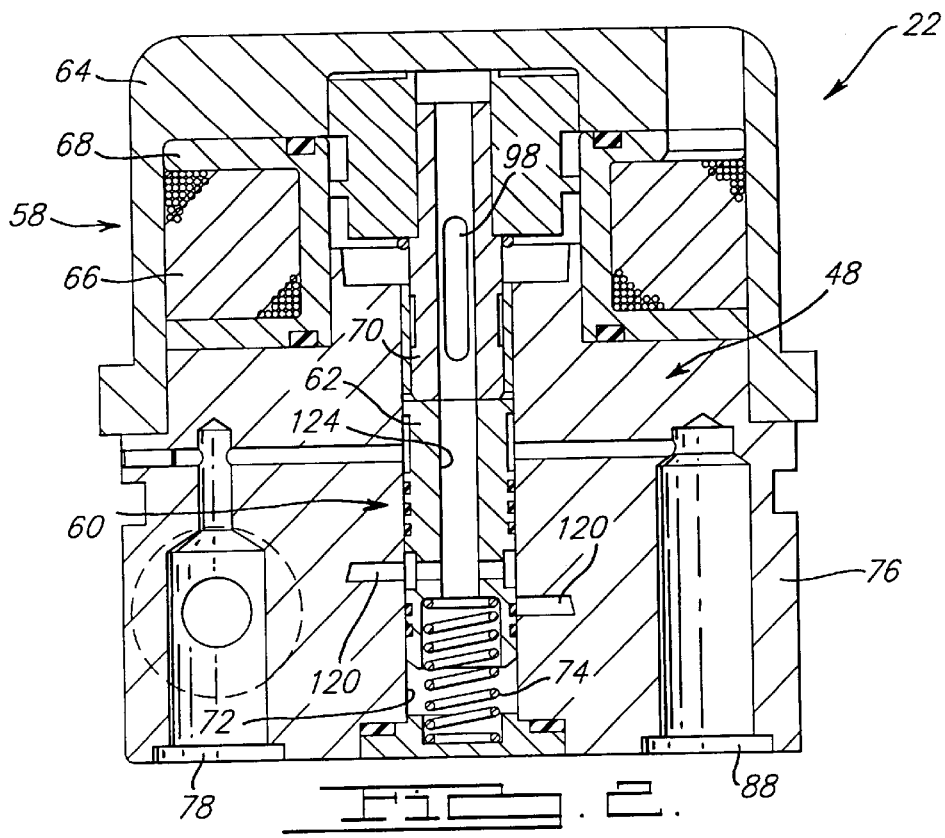
FIG. 2 is a schematic side view illustrating the continuously variable servo valve shown in FIG. 1 when the shock absorber is configured to provide a firm ride during rebound and a soft ride during compression of the shock absorber.

Referring now to FIGS. 1 and 2, solenoid valve assembly 48 sealingly engages valve interface 46 and is sealingly secured to reserve tube 18. Solenoid valve assembly 48 comprises a solenoid coil assembly 58, a solenoid valve body assembly 60 and a spool valve 62. Solenoid coil assembly 58 includes a housing 64 within which is contained a set of windings 66 and a coil bobbin 68. A valve member 70 is disposed within the set of windings and moves axially within the windings in response to electrical power being supplied to windings 66 as is well known in the art. Solenoid coil assembly 58 is attached to solenoid valve body assembly 60. Spool valve 62 is disposed within a bore 72 extending through solenoid valve body assembly 60. A spring 74 biases spool valve 62 towards solenoid coil assembly 58. Thus, solenoid coil assembly 58 operates to move spool valve 62 axially within bore 72 of solenoid valve body assembly 60. Spool valve 62 is normally in an upper position as shown in FIG. 2 and is movable to a lower position as shown in FIG. 4 when full power is being supplied to solenoid coil assembly 58. By the use of pulse width modulation, the position of spool valve 62 can be intermediate the positions shown in FIGS. 2 and 4 which is the position shown in FIG. 3.

Figure 5:
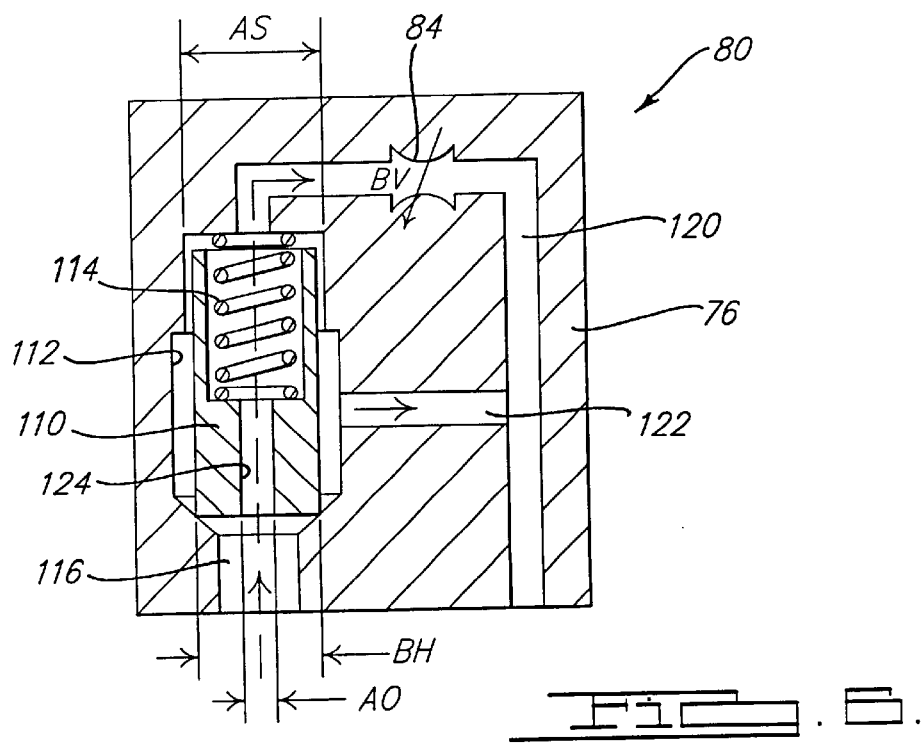
FIG. 5 is a schematic view illustrating the hydraulic fluid circuit incorporated into the shock absorber shown in FIG. 1.

Referring now to FIGS. 2 and 5, solenoid valve body assembly 60 comprises a valve body 76, a compression inlet 78, a compression main poppet 80, a compression co-poppet 82, a compression orifice 84, a rebound inlet 88, a rebound main poppet 90, a rebound co-poppet 92 and a rebound orifice 94. Solenoid valve assembly 60 is positioned such that valve body 76 sealingly engages valve interface 46 with compression inlet 78 sealingly engaging compression outlet 56 and with rebound inlet 88 sealingly engaging rebound outlet 54. A fluid passageway 98 extends between and fluidly connects bore 72 and reserve chamber 36.

Referring now to FIG. 5, a fluid schematic diagram is shown. Fluid flow through compression inlet 78 is directed to compression main poppet 80, compression co-poppet 82 and compression orifice 84. Fluid flow through compression main poppet 80 and compression co-poppet 82 is directed back to reserve chamber 36. Fluid flow through compression orifice 84 is directed through spool valve 62 and then returned to reserve chamber 36. Compression main poppet 80 is urged into a closed position by a biasing member 100 and the fluid pressure present at a position between compression orifice 84 and spool valve 62. Fluid pressure from compression inlet 78 urges compression main poppet 80 towards an open position. In a similar manner, compression co-poppet 82 is urged into a closed position by a biasing member 102 and the fluid pressure present at a position between compression orifice 84 and spool valve 62. Fluid pressure from compression inlet 78 also urges compression co-poppet 82 toward an open position. Thus by controlling the amount of fluid allowed to pass from compression inlet 78 to reserve chamber 36 through compression orifice 84, the fluid pressure urging compression main poppet 80 and compression co-poppet 82 towards the open position can be controlled. Fluid flow through rebound inlet 88 is directed to rebound main poppet 90, rebound co-poppet 92 and rebound orifice 94. Fluid flow through rebound main poppet 90 and rebound co-poppet 92 is directed back to reserve chamber 36. Fluid flow through rebound orifice 94 is directed through spool valve 62 and then returned to reserve chamber 36. Rebound main poppet 90 is urged to a closed position by a biasing member 104 and the fluid pressure present at a position between rebound orifice 94 and spool valve 62. Fluid pressure from rebound inlet 88 urges rebound main poppet 90 towards an open position. In a similar manner, rebound co-poppet 92 is urged toward a closed position by a biasing member 106 and the fluid pressure present at a position between rebound orifice 94 and spool valve 62. Fluid pressure from rebound inlet 88 also urges rebound co-poppet 92 toward an open position. Thus by controlling the amount of fluid allowed to pass from rebound inlet 88 to reserve chamber 36 through rebound orifice 94, the fluid pressure urging rebound main poppet 90 and rebound co-poppet 92 towards the open position can be controlled.

Figure 7:
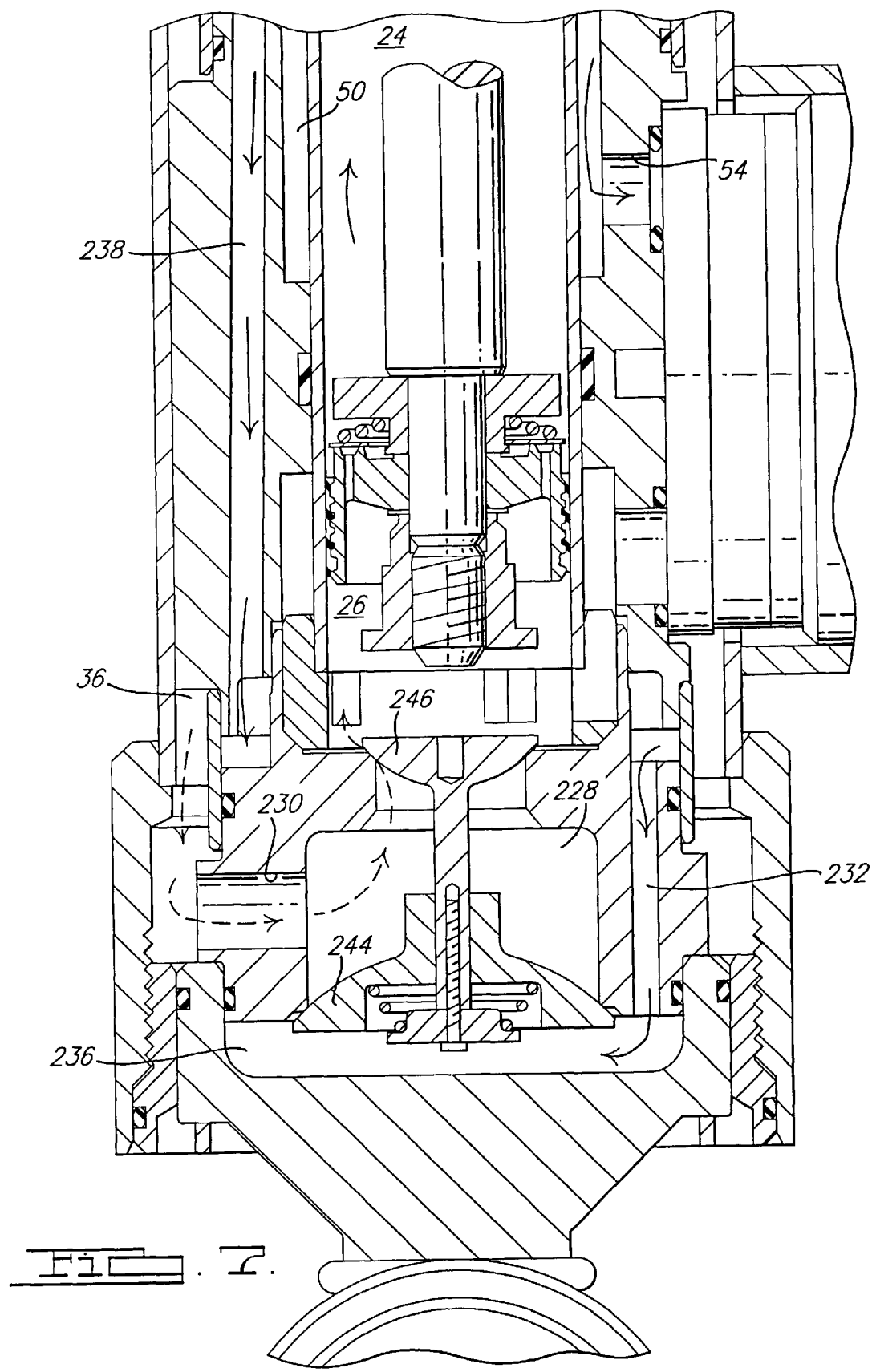
FIG. 7 is an enlarged cross-section of the piston and the base valve assembly during a rebound stroke of the shock absorber shown in FIG. 1.

Referring to FIGS. 1, 7 and 8, base valve assembly 20 of shock absorber 10 comprises a lower mounting adapter 222, a cylinder end 224 and a dual check valve assembly 226. Lower mounting adapter 222 is secured to reserve tube 18 and is adapted to be connected to the unsprung mass of the vehicle. Cylinder end 224 is secured to lower mounting adapter 222 at one end and lower intermediate tube 44 and valve interface 46 at its opposite end. Cylinder end 224 defines a central passage 228 which is in communication with reserve chamber 36 through a passage 230. Cylinder end 224 also defines a passage 232 extending between upper intermediate chamber 50 and a chamber 236 located between lower mounting adapter 222 and cylinder end 224 through a bore 238 extending through valve interface 46. Finally, cylinder end 224 defines a passage 240 extending between chamber 228 and lower working chamber 26 and a passage 242 extending between chamber 228 and chamber 236.

Dual check valve assembly 226 includes a first one-way check valve 244 mechanically connected to a second one-way check valve 246. Check valve 244 allows fluid flow through passage 242 from chamber 228 to chamber 236 but not through passage 242 from chamber 236 to chamber 228. Check valve 246 allows fluid flow through passage 240 between chamber 228 and lower working chamber 26 but not through passage 240 from lower working chamber 26 to chamber 228.

During the operation of shock absorber 10, there is no damping force characteristic in either rebound or compression that is determined by piston 12. The damping force characteristics for shock absorber 10 are controllable by continuously variable servo valve assembly 22 such that in any given complete stroke of shock absorber 10 (rebound to compression to rebound) depending on the amount of current given to energize solenoid coil assembly 58. With little or no current is given to energize solenoid coil assembly 58, continuously variable servo valve assembly 22 generates a firm rebound damping force with a soft compression damping force for shock absorber 10. When full current to solenoid coil assembly 58 is supplied, continuously variable servo valve assembly 22 generates a soft rebound damping force with a firm compression damping force for shock absorber 10.

Another characteristic of continuously variable servo valve assembly 22 is that when a continuously variable energy signal (through pulse width modulation) is provided to solenoid coil assembly 58, a continuously variable sloping bleed and a continuously variable level blowoff for poppets 80, 82, 90 and 92 are provided. The basis for this characteristic is shown in FIG. 6.

Figure 6:
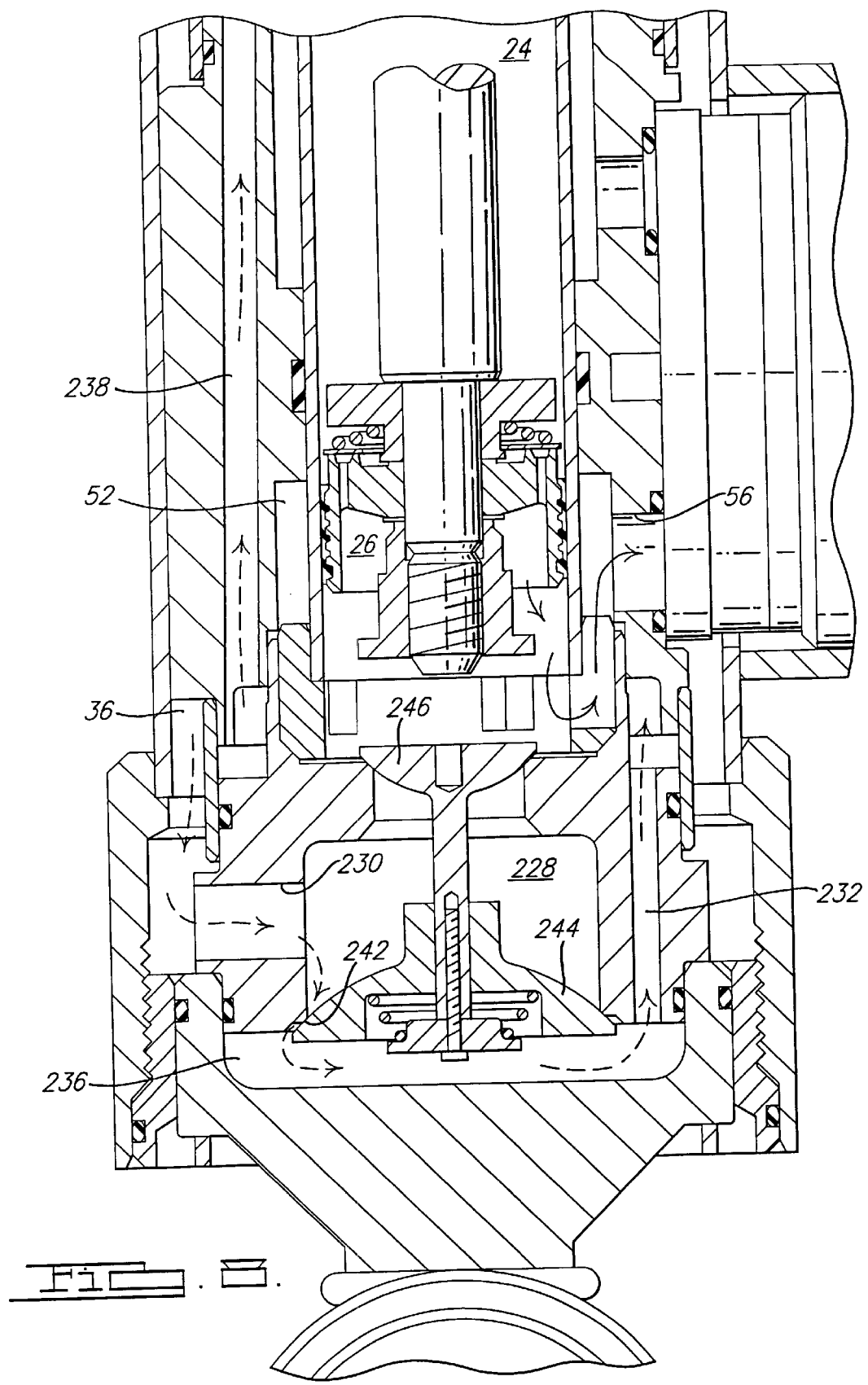
FIG. 6 is a cross-sectional side view illustrating a typical poppet valve in accordance with the present invention.

FIG. 6 discloses schematically compression main poppet 80. While FIG. 6 is directed to compression main poppet 80, it is to be understood that compression co-poppet 82, rebound main poppet 90 and rebound co-poppet 92 operate in a similar manner to main poppet 80. Compression main poppet 80 includes a valve member 110 disposed within a bore 112 in valve body 76 of solenoid valve body assembly 60. A spring 114 urges valve member 110 into a closed position as shown in FIG. 6. Fluid 124 in valve member 110, and then to compression orifice 84. From compression orifice 84, fluid flows back to reserve chamber 36 through a passage 120. A blowoff passage 122 extends from bore 112 to passage 120 to allow fluid flow when valve member 110 is moved to an open position.

Figure 3:
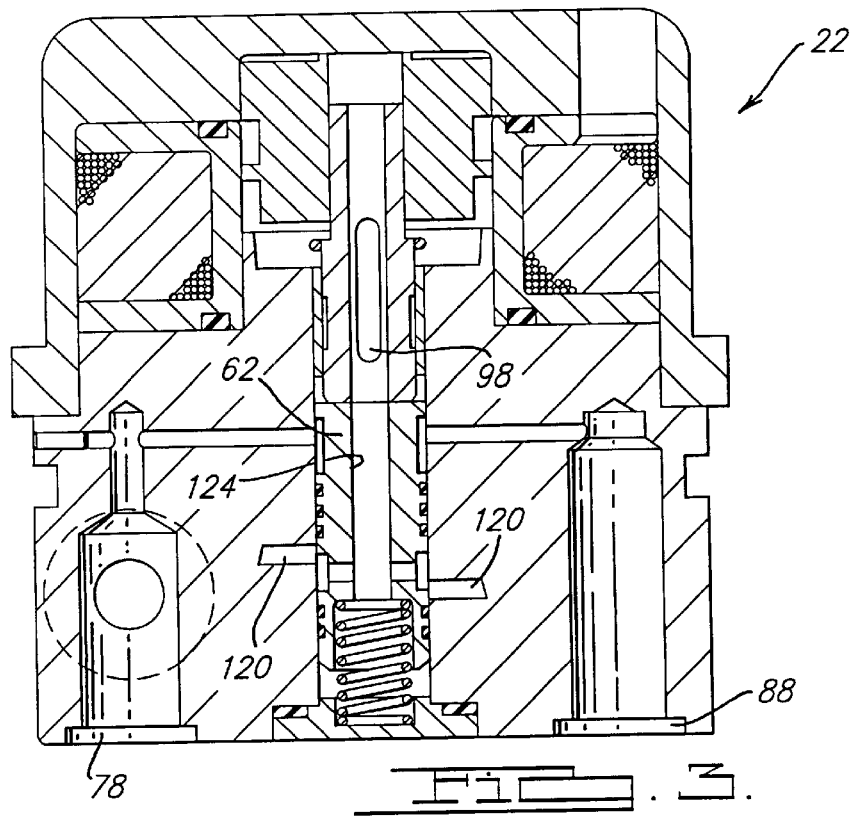
FIG. 3 is a cross-sectional side view illustrating the continuously variable servo valve shown in FIG. 1 when the shock absorber is configured to provide a soft ride during rebound and a soft ride during compression of the shock absorber.
Figure 4:
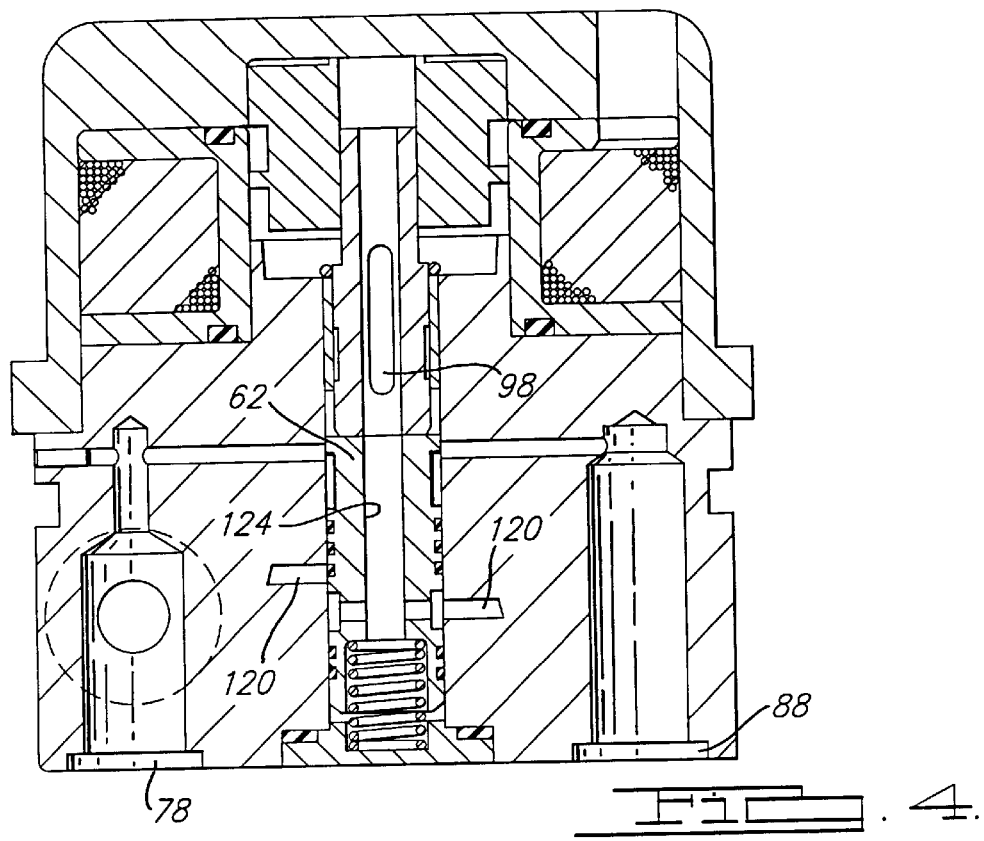
FIG. 4 is a cross-sectional side view illustrating the continuously variable servo valve shown in FIG. 1 when the shock absorber is configured to provide a soft ride during rebound and a firm ride during compression of the shock absorber.

The amount of fluid flow allowed through compression orifice 84 and rebound orifice 94 will be determined by the position of spool valve 62 as shown in FIGS. 2–4. In FIGS. 2–4, passage 120 adjacent rebound inlet 88 returns fluid from passage 120 of rebound poppets 90 and 92 as well as from rebound orifice 94. Passage 120 shown adjacent compression inlet 78 returns fluid from passage 120 of compression poppets 80 and 82 as well as from compression orifice 84. FIG. 2 shows spool valve 62 positioned to fully open compression orifice 84 and fully close rebound orifice 94. Thus, a soft compression damping force and a firm rebound damping force are provided. Fluid is free to flow through compression orifice 84, through a bore 124 extending through spool valve 62, through passageway 98 and back to reserve chamber 36 to provide soft compression damping. Fluid is prohibited from flowing through rebound orifice 94 thus providing firm compression damping. FIG. 3 shows spool valve 62 positioned to open both compression orifice 84 and rebound orifice 94. Thus a soft compression damping force and a soft rebound damping force are provided. Fluid is free to flow through both compression orifice 84 and rebound orifice 94 to reserve chamber 36 as described above to provide soft compression and rebound damping. FIG. 4 shows spool valve 62 positioned to fully close compression orifice 84 and fully open rebound orifice 94. Thus, a firm compression damping force and a soft rebound damping force are provided. Fluid is prohibited from flowing through compression orifice 84 to provide firm compression damping. Fluid is free to flow through rebound orifice 94 to reserve chamber 36 as described above to provide soft rebound damping. The amount of firm and/or soft damping provided will be determined by the position of spool valve 62 which in turn is determined by the amount of current being supplied to solenoid coil assembly 58. Preferably, the amount of current to solenoid coil assembly 58 is controlled using pulse width modulation.

Referring now to FIG. 6, the amount of flow through spool valve 62 also contributes to the damping force blowoff level according to the following formula:

$$Q = \alpha \sqrt{\frac{F}{P\left(\frac{AS}{BH^2} + \frac{AO - AS}{BV^2}\right)}}$$

In the above formula:

$Q$ = the blowoff level $\alpha$ = flow coefficient of damping fluid $F$ = force $P$ = pressure $AS$ = diameter of bore 112

$BH$ = diameter of valve member 110

$AO$ = diameter of bore 124

$BV$ = area of orifice 84 or 94 which is open

By varying the amount of flow through orifice 84 or 94, a variable amount of back pressure is produced to pressure regulated compression main poppet 80. The amount of force or fluid pressure required to displace valve member 110 and move it to its open position is determined by the area deferential of the upstream pressure face versus the downstream pressure face. By continuously varying the pressure on the downstream pressure face through the movement of spool valve 62, the amount of force required to displace valve member 110 can be continuously varied thus resulting in a continuously variable damping force blowoff level.

In order to completely separate the operation of continuously variable servo valve assembly 22 from rebound to compression, a complete separation of the fluid flow of the rebound to the fluid flow of the compression of the shock absorber 10 is required. A description of fluid flow during the rebound stroke and the compression stroke is detailed below.

Referring now to FIGS. 1, 5, 7 and 8, during the rebound stroke, fluid is forced through a passage 130 formed in rod guide 34. The fluid enters upper intermediate chamber 50 which is concentric with working chambers 24 and 26. A first portion of the fluid exits through rebound outlet 54 and enters rebound inlet 88 of continuously variable servo valve assembly 22 opening one-way check valve 96. After entering rebound inlet 88, fluid flows to rebound main poppet 90, rebound co-poppet 92 and to rebound orifice 94. As described above, the amount of flow through rebound orifice 94 is controlled by the position of spool valve 62 to control the damping characteristics from a firm ride to a soft ride. Fluid flowing through continuously variable servo valve assembly 22 is directed to reserve chamber 36. The rebound movement of piston 12 creates a low pressure within lower working chamber 26 and a higher pressure within upper working chamber 24. A second portion of fluid flow is directed from upper working chamber 24 into intermediate chamber 50, through bore 238, through passage 232 to chamber 236 pressurizing the lower end of check valve 244 thus keeping it closed. One-way check valve 246 opens due to the pressure differential between lower working chamber 26 and reserve chamber 36 allowing fluid flow from reserve chamber 36 through passage 230 and into chamber 228.

From chamber 228, fluid flows through check valve 246 to lower working chamber 26.

During the compression stroke, a first portion of fluid flow is forced through a passage 132 formed in base valve assembly 20. The fluid enters lower intermediate chamber 52 which is concentric with working chambers 24 and 26. Fluid exits through compression outlet 56 and enters compression inlet 78 of continuously variable servo valve assembly 22. After entering compression inlet 78, fluid flows to compression main poppet 80, compression co-poppet 82 and to compression orifice 84. As described above, the amount of flow through compression orifice 84 is controlled by the position of spool valve 62 to control the damping characteristics from a soft ride to a firm ride. Fluid flowing through continuously variable servo valve assembly 22 is directed to reserve chamber 36. Because the pressure in lower working chamber 26 is greater than the pressure in reserve chamber 36, check valve 246 remains closed. The compression movement of piston 12 creates a low pressure within upper working chamber 24 that is lower than the pressure within reserve chamber 36. Thus, check valve 244 opens to allow fluid flow from reserve chamber 36 through passage 230 and into chamber 228. From chamber 228, fluid flows through passage 242 and check valve 244, into chamber 236, through passage 232, through bore 238, through passage 130 and into upper working chamber 24.

The above construction for shock absorber 10 thus provides an infinitely variable solenoid actuated continuously variable shock absorber. Some, but not all of the advantages of this contraction are given below. First, shock absorber 10 provides a greater differentiation from soft to firm damping forces in compression due to the introduction of separate compression flow passages and check valves. Second, shock absorber 10 provides for a separately tunable rebound and compression valving. Third, shock absorber 10 provides soft compression damping forces and firm rebound damping forces during the same stroke. Conversely, firm compression damping forces and soft rebound damping forces during the same stroke are also available. Fourth, shock absorber 10 nullifies the need for a piston valving system. Fifth, shock absorber 10 allows for continuously variable bleed and blowoff features. Sixth, continuously variable servo valve assembly 22 differentiates between compression strokes and rebound strokes.

While the above detailed description describes the preferred embodiment of the present invention, it should be understood that the present invention is susceptible to modification, variation and alteration without deviating from the scope and fair meaning of the subjoined claims.

What is claimed is:

1. An adjustable shock absorber comprising:
   a pressure tube defining a working chamber;
   a reserve tube surrounding said pressure tube, said reserve tube defining a reserve chamber;
   a piston rod extending through said pressure tube and into said working chamber;
   a valveless piston slidably disposed within said pressure tube and connected to said piston rod, said piston dividing said working chamber into an upper working chamber and a lower working chamber;
   a valve assembly separate from said piston in communication with said reserve chamber and said upper and lower working chambers, said valve assembly including a first variable orifice for controlling flow between said upper working chamber and said reserve chamber to generate a first damping load and a second variable orifice for controlling flow between said lower working chamber and said reserve chamber to generate a second damping load;
   a base valve assembly disposed within said reserve chamber, said base valve assembly comprising:
     a first check valve disposed between said lower working chamber and said reserve chamber, said first check valve allowing fluid flow from said reserve chamber to said lower working chamber and prohibiting fluid flow from said lower working chamber to said reserve chamber; and
     a second check valve disposed between said upper working chamber and said reserve chamber, said second check valve allowing fluid flow from said reserve chamber to said upper working chamber and prohibiting fluid flow from said upper working chamber to said reserve chamber, said second check valve being mechanically connected to said first check valve.

2. The adjustable shock absorber according to claim 1 wherein, said valve assembly includes a solenoid valve having means for controlling said first variable orifice.

3. The adjustable shock absorber according to claim 2 wherein, said means for controlling said first variable orifice includes a spool valve.

4. The adjustable shock absorber according to claim 2 wherein, said solenoid valve includes means for controlling said second variable orifice.

5. The adjustable shock absorber according to claim 4 wherein, said means for controlling said first and second orifices include a spool valve.

6. The adjustable shock absorber according to claim 1 wherein, said valve assembly includes a first variable blowoff valve in communication with said upper working chamber.

7. The adjustable shock absorber according to claim 6 wherein, said first variable blowoff valve is in communication with said lower working chamber.

8. The adjustable shock absorber according to claim 6 wherein, said first variable blowoff valve being in communication with said reserve chamber.

9. The adjustable shock absorber according to claim 6 wherein, said valve assembly includes a solenoid valve having means for controlling said first variable orifice.

10. The adjustable shock absorber according to claim 9 wherein, said means for controlling said first variable orifice includes a spool valve.

11. The adjustable shock absorber according to claim 9 wherein, said solenoid valve includes means for controlling said second variable orifice.

12. The adjustable shock absorber according to claim 6 wherein, said valve assembly includes a second blowoff valve in communication with said lower working chamber.

13. The adjustable shock absorber according to claim 12 wherein, said first variable blowoff valve is in communication with said lower working chamber and said second blowoff valve is in communication with said upper working chamber.

14. The adjustable shock absorber according to claim 12 wherein, said first and second blowoff valves being in communication with said reserve chamber.

15. The adjustable shock absorber according to claim 12 wherein, said valve assembly includes a solenoid valve having means for controlling said first variable orifice.

16. The adjustable shock absorber according to claim 15 wherein, said means for controlling said first variable orifice includes a spool valve.

17. The adjustable shock absorber according to claim 16 wherein, said solenoid valve includes means for controlling said second variable orifice.

* * * * *

UNITED STATES PATENT AND TRADEMARK OFFICE
CERTIFICATE OF CORRECTION

PATENT NO.     : 6,464,048 B1                                            Page 1 of 1
DATED          : October 15, 2002
INVENTOR(S)    : Gary W. Groves et al.

It is certified that error appears in the above-identified patent and that said Letters Patent is hereby corrected as shown below:

<u>Title page,</u>
Item [75], Inventors, "Kazmirski" residence: "CO" should be -- OH --; and "Zebolsky" residence: "Tecumseh, MI" should be -- Marshall, MI --

<u>Column 5,</u>
Line 28, after "Fluid" and before "124" insert:
-- flow from compression inlet 78 is directed to
a fluid inlet 116, through an internal bore --

Signed and Sealed this

Sixth Day of May, 2003

JAMES E. ROGAN
*Director of the United States Patent and Trademark Office*